US012620066B2

(12) United States Patent
Nagare et al.

(10) Patent No.: US 12,620,066 B2
(45) Date of Patent: May 5, 2026

(54) SYSTEMS AND METHODS FOR COMPUTED TOMOGRAPHY IMAGE DENOISING WITH A BIAS-REDUCING LOSS FUNCTION

(71) Applicants: GE Precision Healthcare LLC, Wauwatosa, WI (US); Purdue Research Foundation, West Lafayette, IN (US); University of Notre Dame du Lac, South Bend, IN (US)

(72) Inventors: Madhuri Mahendra Nagare, West Lafayette, IN (US); Roman Melnyk, New Berlin, WI (US); Obaidullah Rahman, South Bend, IN (US); Ken Sauer, South Bend, IN (US); Charles Bouman, Jr., West Lafayette, IN (US)

(73) Assignees: GE PRECISION HEALTHCARE LLC, Wauwatosa, WI (US); PURDUE RESEARCH FOUNDATION, West Lafayette, IN (US); UNIVERSITY OF NOTRE DAME DU LAC, South Bend, IN (US)

( * ) Notice: Subject to any disclaimer, the term of this patent is extended or adjusted under 35 U.S.C. 154(b) by 827 days.

(21) Appl. No.: 17/662,161

(22) Filed: May 5, 2022

(65) Prior Publication Data

US 2022/0375038 A1 Nov. 24, 2022

Related U.S. Application Data

(60) Provisional application No. 63/185,960, filed on May 7, 2021.

(51) Int. Cl.
*G06T 5/70* (2024.01)
*G06F 18/214* (2023.01)
*G06T 7/00* (2017.01)

(52) U.S. Cl.
CPC .............. *G06T 5/70* (2024.01); *G06F 18/214* (2023.01); *G06T 7/0012* (2013.01); *G06T 2207/10072* (2013.01)

(58) Field of Classification Search
CPC ..................... G06T 5/70; G06T 7/0012; G06T 2207/10072; G06T 5/60;
(Continued)

(56) References Cited

U.S. PATENT DOCUMENTS

| | | | | |
|---|---|---|---|---|
| 2010/0067821 A1* | 3/2010 | Baqai | .................... | G06T 5/20 |
| | | | | 382/261 |
| 2017/0064204 A1* | 3/2017 | Sapiro | ................... | G06T 5/20 |

(Continued)

FOREIGN PATENT DOCUMENTS

| | | | | |
|---|---|---|---|---|
| WO | WO-2018187020 A1 * | 10/2018 | ........... | G06T 11/006 |

OTHER PUBLICATIONS

Bromley, J. et al., "Signature Verification using a "Siamese" Time Delay Neural Network," International Journal of Pattern Recognition and Artificial Intelligence, vol. 7, No. 4, Aug. 1993, 8 pages.
(Continued)

*Primary Examiner* — Brandon J Miller
(74) *Attorney, Agent, or Firm* — McCoy Russell LLP

(57) ABSTRACT

Systems and methods for computed tomography imaging are provided. In one embodiment, a method includes acquiring an image, inputting the image to a machine learning model to generate a denoised image, the machine learning model trained with a loss function that weights variance differently from bias, and outputting the denoised image. In this way, structural details in denoised CT images may be improved while maintaining textural information in the denoised images.

15 Claims, 8 Drawing Sheets

(58) Field of Classification Search
CPC . G06T 2207/10081; G06T 2207/20084; G06F
18/214; G06V 10/82; G06V 10/30
See application file for complete search history.

(56) References Cited

U.S. PATENT DOCUMENTS

| | | | | |
|---|---|---|---|---|
| 2018/0293711 | A1* | 10/2018 | Vogels | G06F 17/10 |
| 2020/0134883 | A1* | 4/2020 | Nett | G06T 15/04 |
| 2020/0294287 | A1* | 9/2020 | Schlemper | G16H 30/40 |
| 2021/0158487 | A1* | 5/2021 | Nakagawa | G06T 3/4015 |
| 2022/0107378 | A1* | 4/2022 | Dey | G01R 33/56 |

OTHER PUBLICATIONS

Wang, Z. et al., "Image Quality Assessment: From Error Visibility to Structural Similarity," IEEE Transactions on Image Processing, vol. 13, No. 4, Apr. 13, 2004, 13 pages.

Bouman, C., "Model Based Imaging," Purdue University, School of Electrical and Computer Engineering, Rochester Institute of Technology, 2013, 460 pages.

Kingma, D. et al., "ADAM: A Method for Stochastic Optimization," arXiv Cornell University Website, Available Online at https://arxiv.org/abs/1412.6980, Available as Early as Dec. 22, 2014, 15 pages.

"Keras: Simple. Flexible. Powerful.," Keras Website, Available Online at https://keras.io/, Available as Early as Apr. 15, 2015, 5 pages.

Chen, H. et al., "Low-Dose CT Denoising With Convolutional Neural Network," Proceedings of the 2017 IEEE 14th International Symposium on Biomedical Imaging (ISBI 2017), Apr. 18, 2017, Melbourne, VIC, Australia, 4 pages.

Chen, H. et al., "Low-Dose CT with a Residual Encoder-Decoder Convolutional Neural Network (RED-CNN)," IEEE Transactions on Medical Imaging, vol. 36, No. 12, Jun. 13, 2017, 12 pages.

Zhang, K. et al., "Beyond a Gaussian Denoiser: Residual Learning of Deep CNN for Image Denoising," IEEE Transactions on Image Processing, vol. 26, No. 7, Jul. 2017, Available Online Feb. 1, 2017, 14 pages.

Kang, E. et al., "A deep convolutional neural network using directional wavelets for low-dose X-ray CT reconstruction," Medical Physics, vol. 14, No. 10, Oct. 13, 2017, 16 pages.

Wolterink, J. et al., "Generative Adversarial Networks for Noise Reduction in Low-Dose CT," IEEE Transactions on Medical Imaging, vol. 36, No. 12, Dec. 2017, Available Online May 26, 2017, 10 pages.

Yang, Q. et al., "Low-Dose CT Image Denoising Using a Generative Adversarial Network With Wasserstein Distance and Perceptual Loss," IEEE Transaction on Medical Imaging, vol. 37, No. 6, Jun. 2018, Available Online Apr. 17, 2018, 10 pages.

Li, M. et al., "SACNN: Self-Attention Convolutional Neural Network for Low-Dose CT Denoising With Self-Supervised Perceptual Loss Network," IEEE Transactions on Medical Imaging, vol. 39, No. 7, Jul. 2020, Available Online Jan. 21, 2020, 13 pages.

Hsieh, J. et al., "A new era of image reconstruction:TrueFidelity," Technical White Paper on Deep Learning Image Reconstruction, GE Healthcare Website, Available Online at https://www.gehealthcare.com/-/issmedia/040dd213fa89463287155151fdb01922.pdf, Available as Early as Sep. 19, 2020, 15 pages.

* cited by examiner

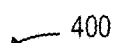
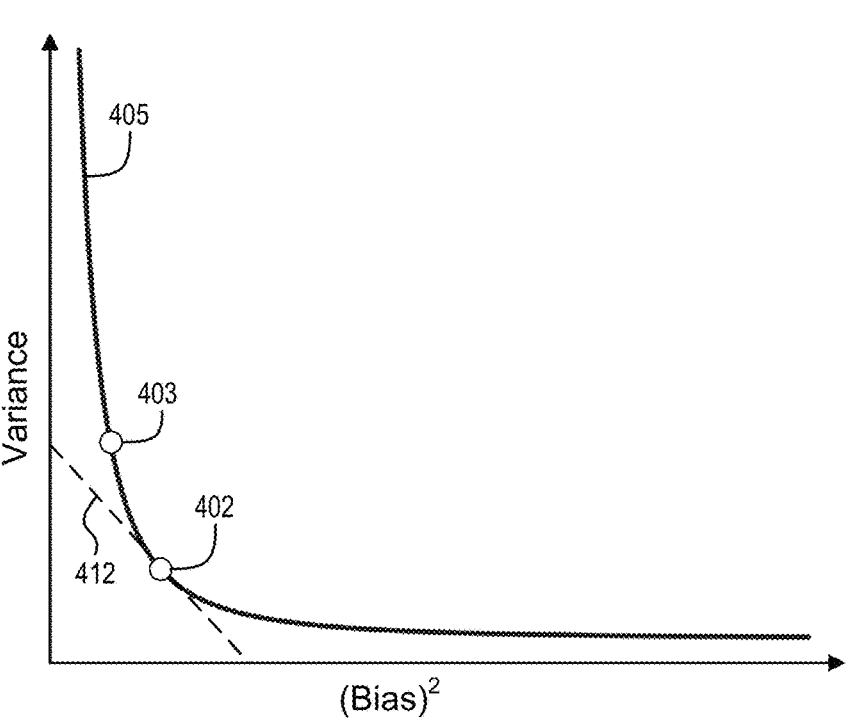
FIG. 4
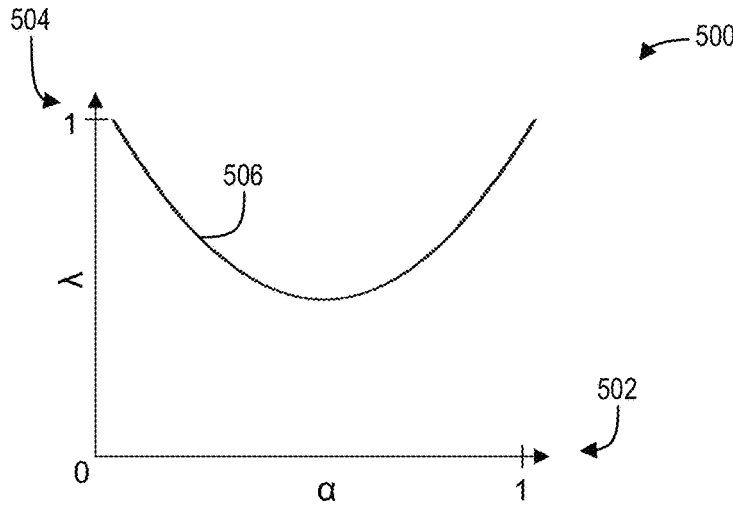
FIG. 5

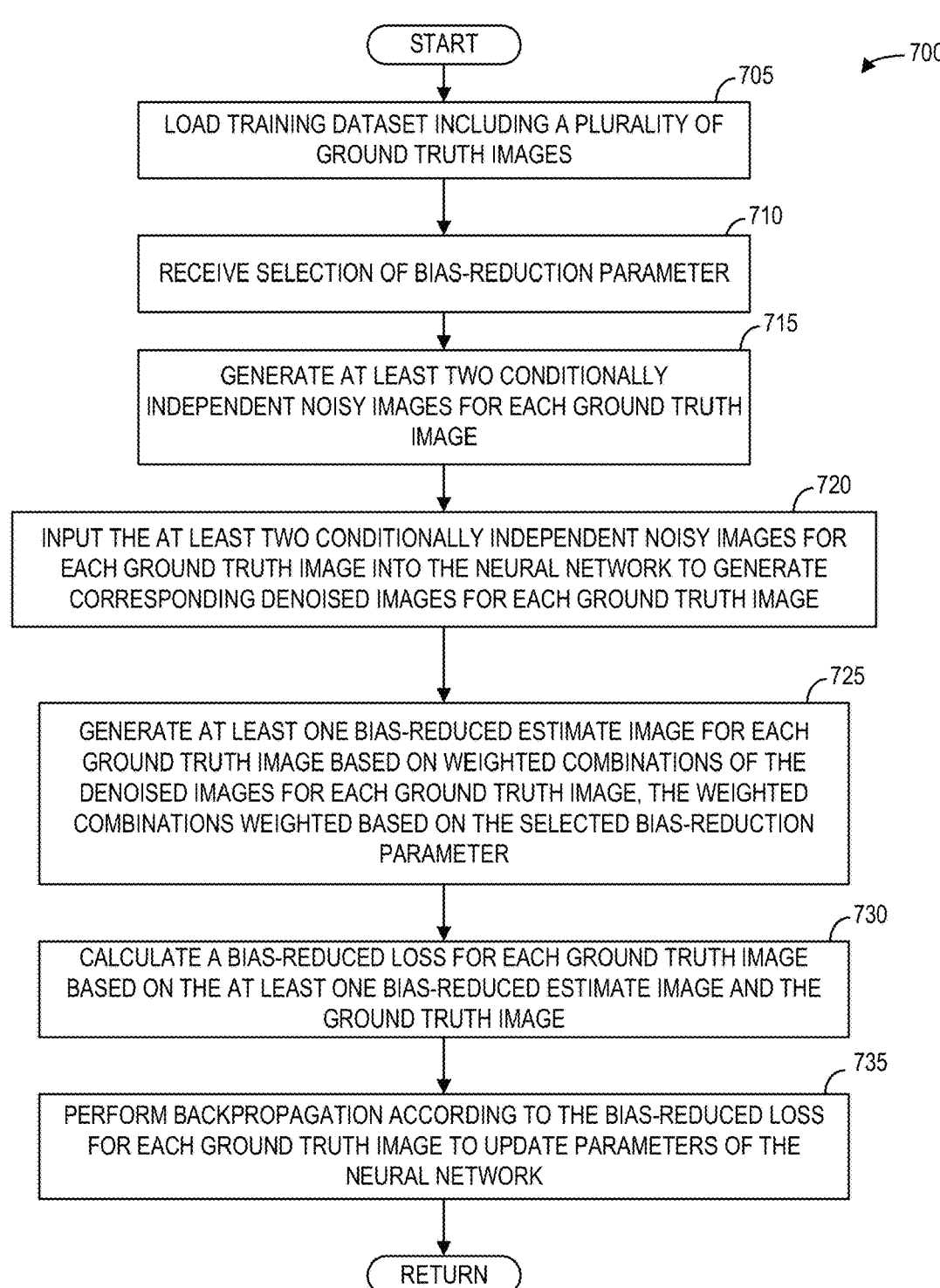

START

705
LOAD TRAINING DATASET INCLUDING A PLURALITY OF
GROUND TRUTH IMAGES

710
RECEIVE SELECTION OF BIAS-REDUCTION PARAMETER

715
GENERATE AT LEAST TWO CONDITIONALLY
INDEPENDENT NOISY IMAGES FOR EACH GROUND TRUTH
IMAGE

720
INPUT THE AT LEAST TWO CONDITIONALLY INDEPENDENT NOISY IMAGES FOR
EACH GROUND TRUTH IMAGE INTO THE NEURAL NETWORK TO GENERATE
CORRESPONDING DENOISED IMAGES FOR EACH GROUND TRUTH IMAGE

725
GENERATE AT LEAST ONE BIAS-REDUCED ESTIMATE IMAGE FOR EACH
GROUND TRUTH IMAGE BASED ON WEIGHTED COMBINATIONS OF THE
DENOISED IMAGES FOR EACH GROUND TRUTH IMAGE, THE WEIGHTED
COMBINATIONS WEIGHTED BASED ON THE SELECTED BIAS-REDUCTION
PARAMETER

730
CALCULATE A BIAS-REDUCED LOSS FOR EACH GROUND TRUTH IMAGE
BASED ON THE AT LEAST ONE BIAS-REDUCED ESTIMATE IMAGE AND THE
GROUND TRUTH IMAGE

735
PERFORM BACKPROPAGATION ACCORDING TO THE BIAS-REDUCED LOSS
FOR EACH GROUND TRUTH IMAGE TO UPDATE PARAMETERS OF THE
NEURAL NETWORK

RETURN

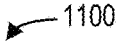
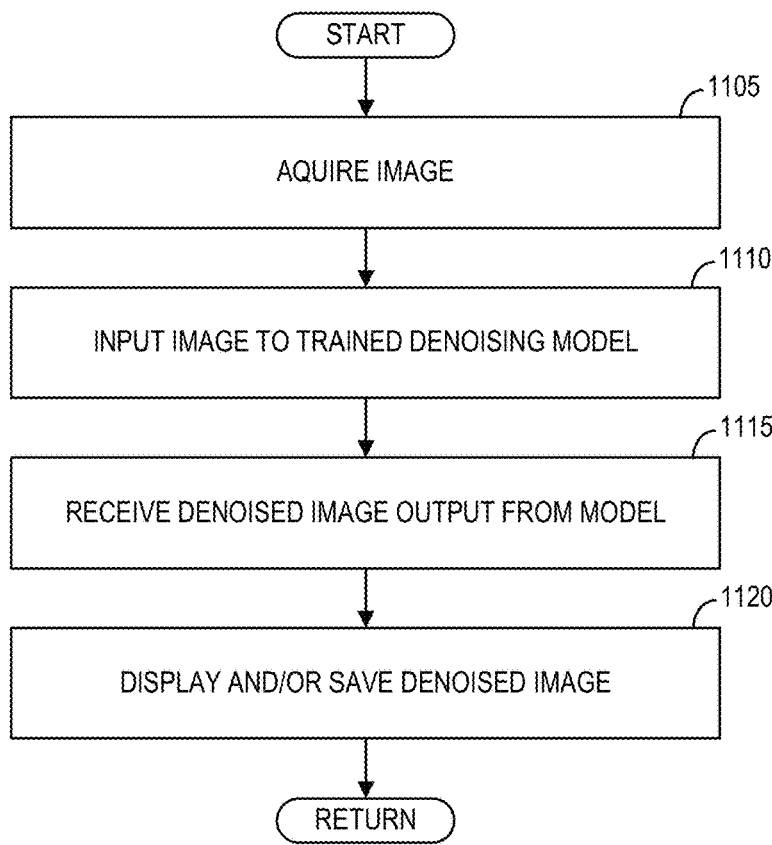
1100
START
1105
AQUIRE IMAGE
1110
INPUT IMAGE TO TRAINED DENOISING MODEL
1115
RECEIVE DENOISED IMAGE OUTPUT FROM MODEL
1120
DISPLAY AND/OR SAVE DENOISED IMAGE
RETURN
FIG.11

SYSTEMS AND METHODS FOR COMPUTED TOMOGRAPHY IMAGE DENOISING WITH A BIAS-REDUCING LOSS FUNCTION

CROSS-REFERENCE TO RELATED APPLICATIONS

The present application claims priority to U.S. Provisional Patent Application No. 63/185,960, entitled "SYSTEMS AND METHODS FOR COMPUTED TOMOGRAPHY IMAGE DENOISING WITH A BIAS-REDUCING LOSS FUNCTION," and filed May 7, 2021, the entire contents of which is hereby incorporated by reference for all purposes.

FIELD

Embodiments of the subject matter disclosed herein relate to medical imaging, and more particularly to image denoising for computed tomography imaging.

BACKGROUND

Computed tomography (CT) may be used as a non-invasive medical imaging technique. Specifically, CT imaging data acquisition may include passing X-ray beams through an object, such as a patient, such that the X-ray beams are attenuated and then collecting the attenuated X-ray beams at an X-ray detector array. The acquired CT imaging data may be a set of line integral measurements corresponding to a distribution of attenuation coefficients of the object. The distribution may be reconstructed from the set of line integral measurements as a viewable image via a backprojection, or backward projection, step in an analytical or an iterative reconstruction algorithm.

BRIEF DESCRIPTION

In one embodiment, a method may include acquiring an image, inputting the image to a machine learning model to generate a denoised image, the machine learning model trained with a loss function that weights variance differently from bias, and outputting the denoised image. In this way, the structural and textural details in denoised CT images may be improved while denoising the images.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below:

FIG. 4 shows a graph illustrating a tradeoff between bias and variance for a bias-reducing loss function in contrast with a conventional mean squared error loss function, according to an embodiment;

FIG. 5 shows a graph illustrating a relationship between bias-reduction parameters, according to an embodiment;

FIG. 7 shows a high-level flow chart illustrating an example method for training a neural network for image denoising with a bias-reducing loss function, according to an embodiment;

FIG. 11 is a flow chart illustrating a method for denoising an image with a trained denoising model, according to an embodiment.

DETAILED DESCRIPTION

Figure 1:
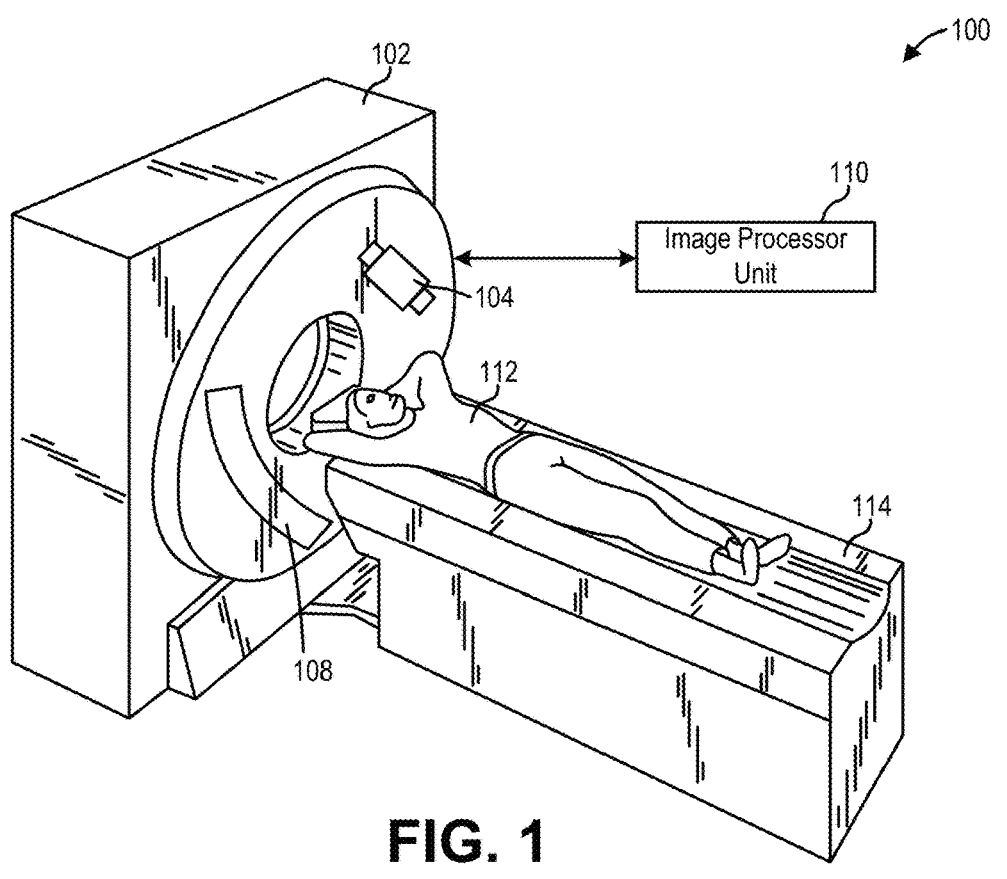
FIG. 1 shows a pictorial view of an exemplary medical imaging system, according to an embodiment.
Figure 2:
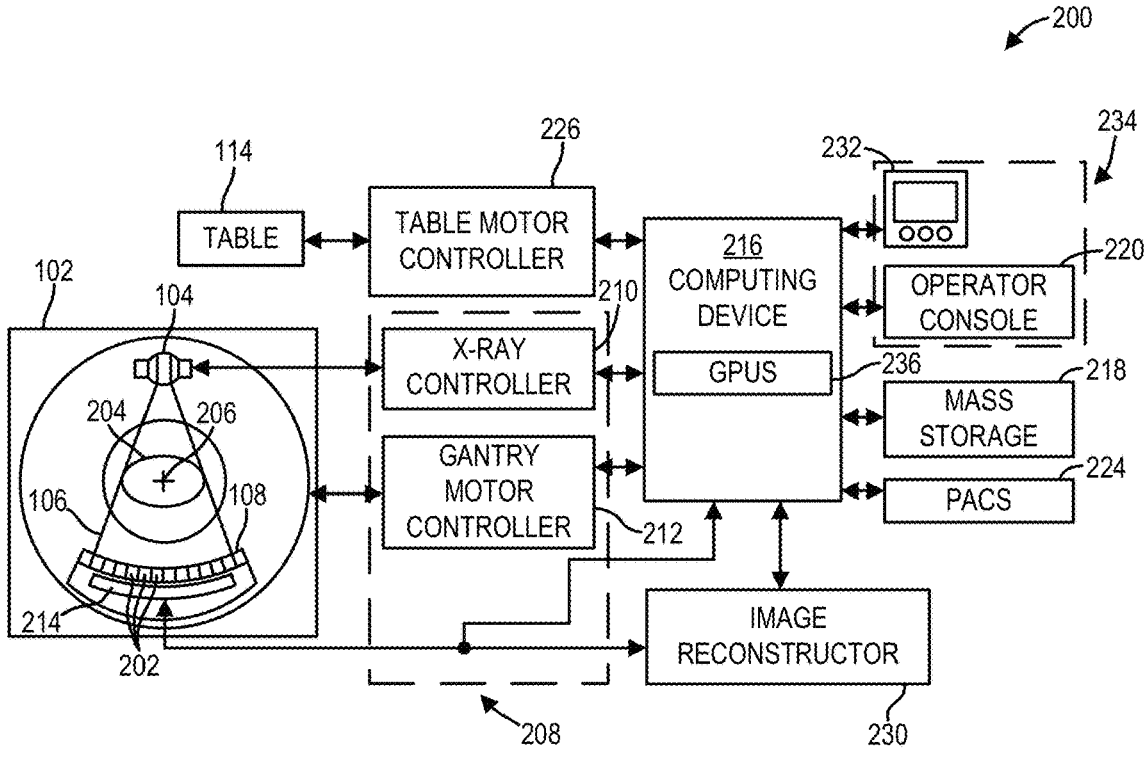
FIG. 2 shows a schematic block diagram of the exemplary medical imaging system, according to an embodiment.
Figure 3:
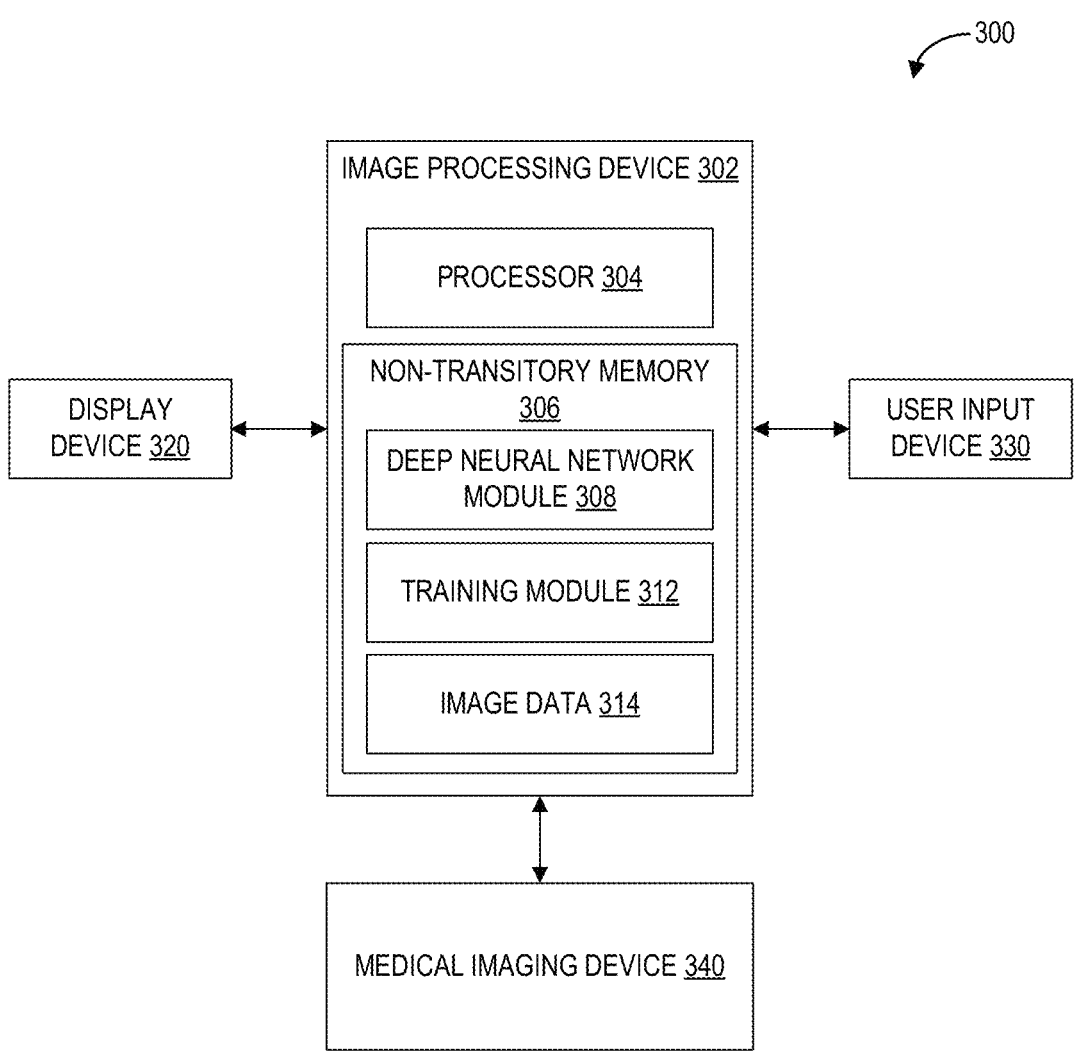
FIG. 3 shows a schematic block diagram of an exemplary medical image processing system, according to an embodiment.
Figure 6:
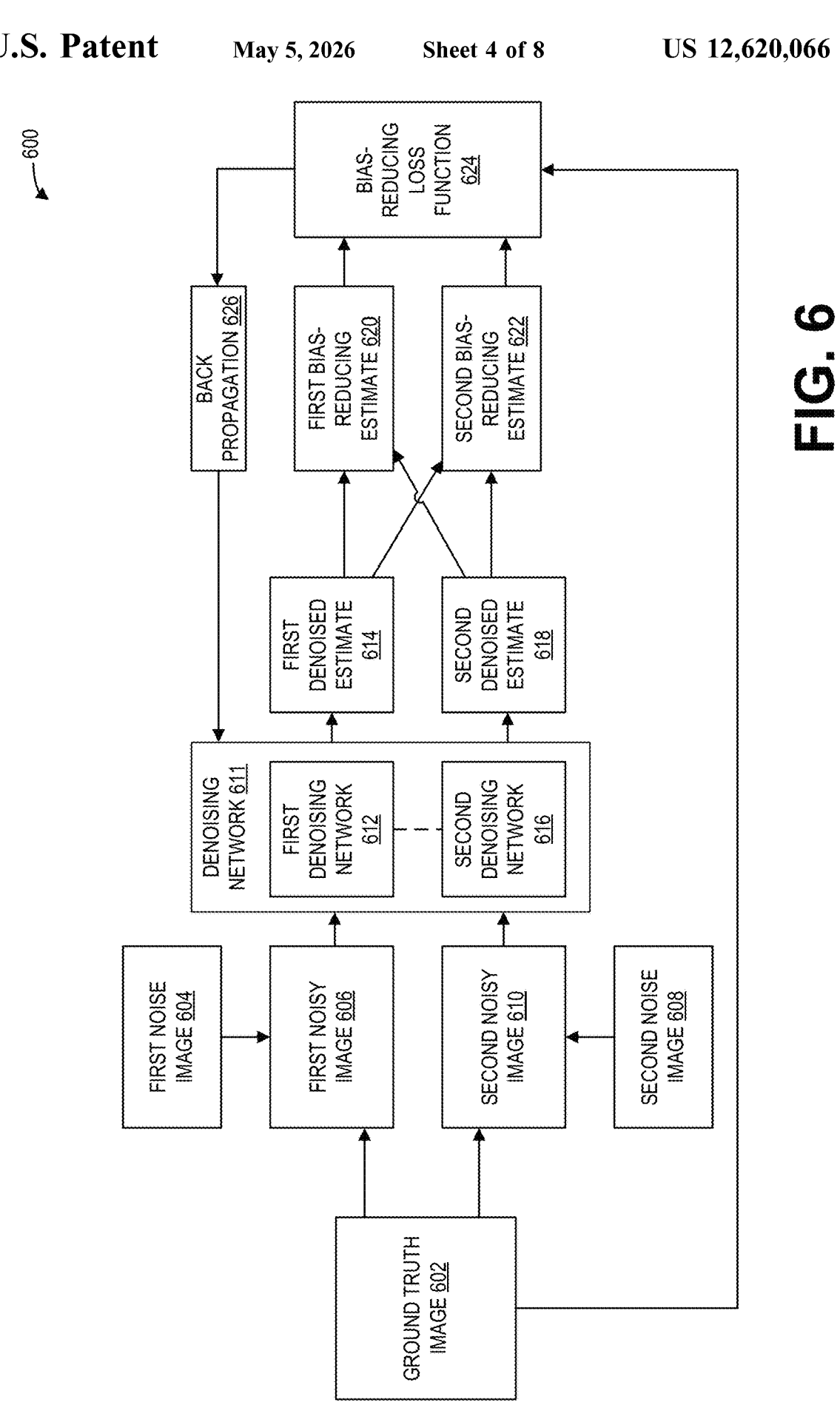
FIG. 6 shows a block diagram illustrating an example architecture for training a neural network configured for image denoising with a bias-reducing loss function, according to an embodiment.
Figure 8:
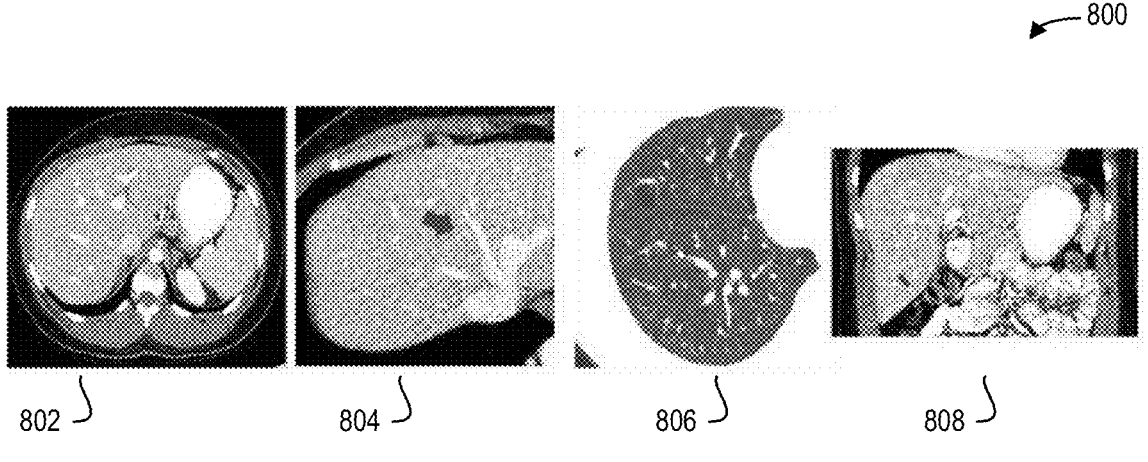
FIG. 8 and FIG. 9 show a set of images illustrating example image denoising with neural network with a bias-reducing loss function, according to an embodiment.
Figure 9:
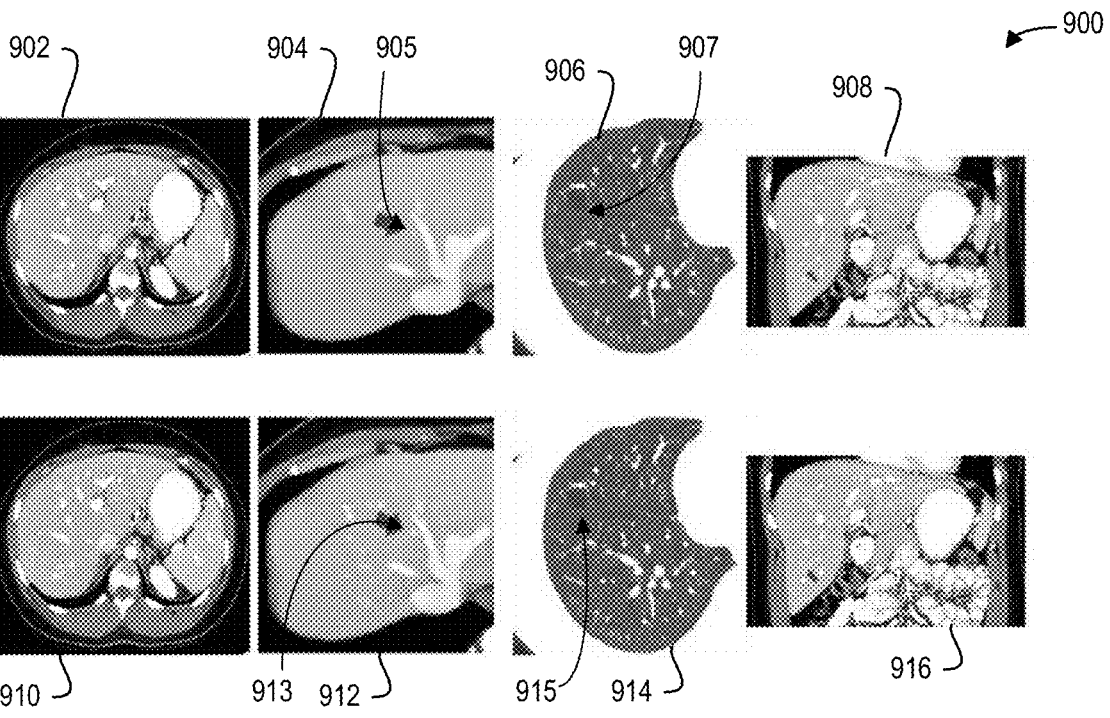
Figure 10:
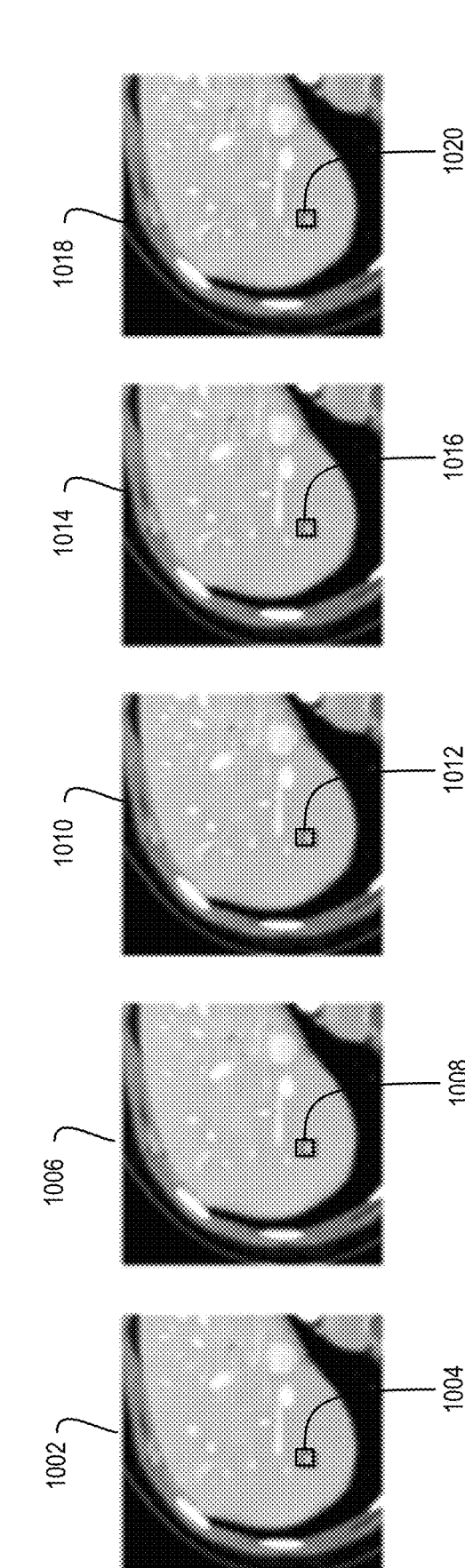
FIG. 10 shows a set of images illustrating example image denoising with neural networks trained with a bias-reducing loss function for different bias-reduction parameters, according to an embodiment.

The following description relates to various embodiments of medical imaging systems. In particular, systems and methods are provided for bias-reduced image denoising for computed tomography (CT) imaging systems. One such medical imaging system configured to acquire CT medical imaging data is depicted in FIGS. 1 and 2, while an image processing system for denoising CT images is depicted in FIG. 3. There is growing interest in the use of deep neural network (DNN)-based image denoising to reduce the x-ray dosage for patients in medical CT. For example, noise reduction methods based on convolutional neural networks (CNNs) enable a reduction in x-ray dosage of a patient while achieving similar image quality. Mean squared error (MSE) loss functions are typically used for DNN training because they result in a trained network that approximately maximizes the peak signal-to-noise ratio (PSNR). However, MSE loss functions in DNN training weight errors due to bias and variance equally, but the error due to bias is typically more egregious because the bias error results in the loss of image texture and detail. In other words, the MSE loss function tends to produce denoised images that are overly smooth and lack texture. An effective denoiser removes noise while maintaining the texture and detail in the image. Bias is a systematic change which would occur over many estimates whose noise was averaged away. In contrast, variance is the zero mean error associated with noise. In practice, the error due to bias is less desirable because it results in loss of image texture and detail. The systems and methods provided herein address the smoothness due to bias in denoised images which affects the resolution of images. For machine learning algorithms, there exists a bias-variance tradeoff that in the context of denoising, may be considered a tradeoff between resolution and noise, as shown in FIG. 4. The systems and methods provided herein include an approach to designing a loss function that penalizes variance and bias differently. The loss function provided herein allows training of a DNN denoiser, as shown in FIGS. 6 and 7, such that the amount of texture and detail retained in the denoised image may be controlled through a user-adjustable parameter, thereby allowing continuous control of the bias-variance or resolution-noise tradeoff. The proposed loss function enhances texture and detail in denoised images with only a slight increase in the MSE, as shown in FIGS. 8, 9, and 10. An image may be denoised with the disclosed denoising model according to the method shown in FIG. 11.

Referring now to FIG. 1, an exemplary imaging system 100 is depicted according to an embodiment. In the illustrated embodiment, the imaging system 100 is an X-ray imaging system configured to perform CT imaging. Though the illustrated embodiment actively acquires medical images, it is understood that other embodiments do not actively acquire medical images. Instead, embodiments may retrieve images or imaging data that was previously acquired by an imaging system and process the imaging data as set forth herein.

The imaging system 100 may be configured to image a subject 112 such as a patient, an inanimate object, one or more manufactured parts, and/or foreign objects such as dental implants, stents, and/or contrast agents present within the body. In one embodiment, the imaging system 100 may include a gantry 102, which in turn, may further include at least one X-ray source 104 configured to project a beam of X-ray radiation 106 (see FIG. 2) for use in imaging the subject 112 laying on a table 114. Specifically, the X-ray source 104 may be configured to project the X-rays 106 towards a detector array 108 positioned on the opposite side of the gantry 102. Although FIG. 1 depicts a curved detector array 108, in certain embodiments, a flat-panel detector may be employed. Further, although FIG. 1 depicts a single X-ray source 104, in certain embodiments, multiple X-ray sources and/or detectors may be employed to project a plurality of X-ray radiation beams 106 for acquiring projection data corresponding to the subject 112 at different energy levels or angular orientations. In some CT imaging embodiments, the X-ray source 104 may enable dual-energy imaging by rapid peak kilovoltage (kVp) switching. In some embodiments, the X-ray detector employed is a photon-counting detector which is capable of differentiating X-ray photons of different energies. In other embodiments, two sets of X-ray sources and detectors are used to generate dual-energy projections, with one set acquired at a low-kVp setting and the other acquired at a high-kVp setting. It should thus be appreciated that the methods described herein may be implemented with single energy acquisition techniques as well as dual energy acquisition techniques.

In certain embodiments, the imaging system 100 further includes an image processor unit 110 configured to reconstruct images of a target volume of the subject 112 using an iterative or analytic image reconstruction method, or a combination of both. For example, in some CT imaging applications, the image processor unit 110 may use an analytic image reconstruction approach such as filtered backprojection (FBP) to reconstruct images of a target volume of the patient. As another example, the image processor unit 110 may use an iterative image reconstruction approach such as advanced statistical iterative reconstruction (ASIR) or model-based iterative reconstruction (MBIR), and the like, to reconstruct images of a target volume of the subject 112. In some examples, the image processor unit 110 may use both an analytic image reconstruction approach such as FBP in addition to an iterative image reconstruction approach. In one embodiment, and as discussed in detail below, the image processor unit 110 may use an iterative image reconstruction approach leveraging one-dimensional homographic resampling transforms.

In some CT imaging system configurations, an X-ray source projects a cone-shaped X-ray radiation beam which is collimated to lie within an X-Y-Z plane of a Cartesian coordinate system (generally referred to as an "imaging plane"). The X-ray radiation beam passes through an object being imaged, such as the patient or subject. The X-ray radiation beam, after being attenuated by the object, impinges upon an array of detectors. The intensity of the attenuated X-ray radiation beam received at the detector array is dependent upon the attenuation of an X-ray radiation beam by the object. Each detector element of the array produces a separate electrical signal that is a measurement (e.g., a line integral measurement) of the X-ray beam attenuation at the detector location. The attenuation measurements from all the detector elements are acquired separately to produce a transmission profile.

In some CT imaging systems, the X-ray source and the detector array are rotated with a gantry about the imaging plane and around the object to be imaged such that an angle at which the radiation beam intersects the object constantly changes. A group of X-ray radiation attenuation measurements, e.g., projection data, from the detector array at one angular position of the gantry is referred to as a "view." A "scan" of the object includes a set of views made at different angular positions, or view angles, during one revolution of the X-ray source and detector about the object. It is contemplated that the benefits of the methods described herein accrue to many medical imaging modalities, so as used herein the term "view" is not limited to the use as described above with respect to projection data from one gantry angle. The term "view" is used to mean one data acquisition whenever there are multiple data acquisitions from different angles, whether from a CT, X-ray radiographic imaging, positron emission tomography (PET), or single-photon emission CT (SPECT) acquisition, and/or any other modality including modalities yet to be developed as well as combinations thereof in fused embodiments.

The projection data is processed to reconstruct an image that corresponds to one or more two-dimensional slices taken through the object or, in some examples where the projection data includes extended axial coverage, e.g., Z-axis illumination, a three-dimensional image volume of the object. One method for reconstructing an image from a set of projection data is referred to in the art as the filtered backprojection technique. Transmission and emission tomography reconstruction techniques also include statistical iterative methods such as maximum likelihood expectation maximization (MLEM) and ordered-subsets expectation maximization reconstruction techniques as well as iterative reconstruction techniques. This process converts the attenuation measurements from a scan into integers (called "CT numbers" or "Hounsfield units" in the case of a CT imaging system), which are used to control the brightness of a corresponding pixel on a display device.

To reduce the total scan time, a "helical" scan may be performed. To perform a "helical" scan, the patient is moved while the data for the prescribed axial coverage is acquired. Such a system generates a single helix from a cone-beam helical scan. The helix mapped out by the cone beam yields projection data from which images in each prescribed slice may be reconstructed.

As used herein, the phrase "reconstructing an image" is not intended to exclude embodiments of the present disclosure in which data representing an image is generated but a viewable image is not. Therefore, as used herein, the term "image" broadly refers to both viewable images and data representing a viewable image. However, many embodiments generate (or are configured to generate) at least one viewable image.

Referring now to FIG. 2, an exemplary imaging system 200 similar to the imaging system 100 of FIG. 1 is depicted. As shown, the imaging system 200 may include multiple components. The components may be coupled to one another to form a single structure, may be separate but located within a common room, or may be remotely located with respect to one another. For example, one or more of the modules described herein may operate in a data server that has a distinct and remote location with respect to other components of the imaging system 200.

In accordance with aspects of the present disclosure, the imaging system 200 may be configured for imaging a subject 204 (e.g., the subject 112 of FIG. 1). In one embodiment, the imaging system 200 may include the detector array 108 (see FIG. 1). The detector array 108 may further include a plurality of detector elements 202 that together sense the X-ray radiation beams 106 that pass through the subject 204 (such as a patient) to acquire corresponding projection data. Accordingly, in one embodiment, the detector array 108 may be fabricated in a multi-slice configuration including the plurality of rows of cells or detector elements 202. In such a configuration, one or more additional rows of the detector elements 202 may be arranged in a parallel configuration for acquiring the projection data.

The gantry 102 may movably support the X-ray source 104 and the detector array 108 mounted opposite to each other on opposed ends. The subject 204 may accordingly be disposed between the X-ray source 104 and the detector array 108, supported by the table 114.

It will be recognized that in some embodiments, the table 114 may further be movable to achieve a desired image acquisition. During such an acquisition of image data, the gantry 102 may be movable to change a position and/or orientation of the X-ray source 104 and/or the detector array 108 relative to the subject 204.

Accordingly, in some embodiments, the gantry 102 may remain fixed during a given imaging session so as to image a single 2D projection of the subject 204. In such embodiments, a position of the gantry 102 and/or the table 114 may be adjusted between imaging sessions so as to image another view of the subject 204.

In other embodiments, such as in CT imaging applications, the imaging system 200 may be configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

In such embodiments, as the X-ray source 104 and the detector array 108 rotate, the detector array 108 may collect data of the attenuated X-ray beams. The data collected by the detector array 108 may undergo preprocessing and calibration to condition and process the data to represent the line integrals of the attenuation coefficients of the scanned subject 204. The processed data are commonly called projections.

In some examples, the individual detectors or detector elements 202 of the detector array 108 may include photon-counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections may be converted to a set of material-density projections. The material-density projections may be reconstructed to form a pair or a set of material-density maps or images of each respective basis material, such as bone, soft tissue, and/or contrast agent maps. The material-density maps or images may be, in turn, associated to form a volume rendering of the basis material, for example, bone, soft tissue, and/or contrast agent, in the imaged volume.

Once reconstructed, the basis material image produced by the imaging system 200 may reveal internal features of the subject 204, expressed in the densities of two basis materials. The density image, or combinations of multiple density images, may be displayed to show these features. In traditional approaches to diagnosis of medical conditions, such as disease states, and more generally of medical events, a radiologist or physician would consider a hard copy or display of the density image, or combinations thereof, to discern characteristic features of interest. Such features might include lesions, sizes and shapes of particular anatomies or organs, and other features that would be discernable in the image based upon the skill and knowledge of the individual practitioner.

In one embodiment, the imaging system 200 may include a control mechanism 208 to control movement of the components such as rotation of the gantry 102 and the operation of the X-ray source 104. In certain embodiments, the control mechanism 208 may further include an X-ray controller 210 configured to provide power and timing signals to the X-ray source 104. Additionally, the control mechanism 208 may include a gantry motor controller 212 configured to control a rotational speed and/or position of the gantry 102 or of various components thereof (e.g., the X-ray source 104, the detector array 108, etc.) based on imaging requirements.

In certain embodiments, the control mechanism 208 may further include a data acquisition system (DAS) 214 configured to sample analog data received from the detector elements 202 and convert the analog data to digital signals for subsequent processing. For photon-counting imaging systems, the DAS 214 may download measured photon counts in one or more energy bins from detector array 108. The DAS 214 may further be configured to selectively aggregate analog data from a subset of the detector elements 202 into so-called macro-detectors, as described further herein.

The data sampled and digitized by the DAS 214 may be transmitted to a computer or computing device 216. In the illustrated embodiment, the computing device 216 may be configured to interface with various components of the imaging system 200. As such, the computing device 216 may be configured to control operation of the imaging system 200. In various embodiments, the computing device 216 may take the form of a mainframe computer, server computer, desktop computer, laptop computer, tablet device, network computing device, mobile computing device, mobile communication device, etc. In one embodiment, the computing device 216 may take the form of an edge device for interfacing between the various components of FIG. 2. In some embodiments, the one or more components of the imaging system 200 configured to acquire X-ray radiation may be considered an X-ray imaging subsystem (e.g., the X-ray source 104, the detector array 108, etc.) of the overall imaging system 200, which may be a computing system further configured to interface with a user and perform a variety of computational processes (e.g., imaging or nonimaging). Accordingly, other components (e.g., the computing device 216, etc.) of the imaging system 200 may be communicably coupled to the X-ray imaging subsystem.

In some embodiments, the computing device 216 may store the data in a storage device or mass storage 218, either included in the computing device 216 (in such examples, the computing device 216 may be referred to as a controller) or a separate device communicably coupled to the computing device 216 (in such examples, the computing device 216 may be referred to as a processor). The storage device 218 may include removable media and/or built-in devices. Specifically, the storage device 218 may include one or more physical, non-transitory devices configured to hold data and/or instructions executable by the computing device 216 to implement the herein described methods. Accordingly, when such methods are implemented, a state of the storage device 218 may be transformed (for example, to hold different, or altered, data). The storage device 218, for example, may include magnetoresistive random-access memory (MRAM), a hard disk drive, a floppy disk drive, a tape drive, a compact disk-read/write (CD-R/W) drive, a Digital Versatile Disc (DVD) drive, a high-definition DVD (HD-DVD) drive, a Blu-Ray drive, a flash drive, and/or a solid-state storage drive. It will be appreciated that the storage device 218 may be a non-transitory storage medium.

Additionally, the computing device 216 may provide commands and parameters to one or more of the DAS 214, the X-ray controller 210, and the gantry motor controller 212 for controlling system operations such as data acquisition and/or processing. In certain embodiments, the computing device 216 controls system operations based on operator input, e.g., via a user interface 234. The computing device 216 receives the operator input, for example, including commands and/or scanning parameters via an operator console 220 operatively coupled to the computing device 216. The operator console 220 may include a physical keyboard, mouse, touchpad, and/or touchscreen to allow the operator to specify the commands and/or scanning parameters.

In some embodiments, the computing device 216 may include, or be coupled to, one or more multicore CPUs or a plurality of general-purpose GPUs (GPUs) 236, where the plurality of GPUs 236 may be configured to execute instructions stored in non-transitory memory of the computing device 216 (e.g., the storage device 218) via highly parallelized data and computation streams.

Although FIG. 2 illustrates only one operator console 220, more than one operator console 220 may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 may either include, or may be coupled to, a picture archiving and communications system (PACS) 224. In an exemplary implementation, the PACS 224 may further be coupled to a remote system such as radiological information systems (e.g., RIS), electronic health or medical records and/or hospital information systems (e.g., EHR/HIS), and/or to an internal or external network (not shown) to allow operators at different locations to supply commands and parameters and/or gain access to the image data.

The computing device 216 may use the operator-supplied and/or system-defined commands and parameters to operate a table motor controller 226, which in turn, may control a table 114 which may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized X-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. For example, one embodiment may use computing resources in a "cloud" network cluster for the image reconstructor 230.

In one embodiment, the image reconstructor 230 may store the images reconstructed in the storage device 218, either via the computing device 216 as shown in FIG. 2 or via a direct connection (not shown). Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

The various methods or processes (such as the method described below with reference to FIG. 7) described further herein may be stored as executable instructions in non-transitory memory on a computing device (or controller), or in communication with a computing device (or processor), in the imaging system 200. In one embodiment, the image reconstructor 230 may include such executable instructions in non-transitory memory, and may apply the methods described herein to reconstruct an image from scanning data. In another embodiment, the computing device 216 may include the instructions in non-transitory memory, and may apply the methods described herein, at least in part, to a reconstructed image after receiving the reconstructed image from the image reconstructor 230. In yet another embodiment, the methods and processes described herein may be distributed across the image reconstructor 230 and the computing device 216.

In operation, the computing device 216 may acquire imaging data and other medical data, which may be translated for display to a user (e.g., a medical professional) via the user interface 234, for example, on the display device 232. As an example, the medical data may be transformed into and displayed at the display device 232 as a user-facing graphical and/or textual format, which may be standardized across all implementations of the imaging system 200 or may be particular to a given facility, department, profession, or individual user. As another example, the imaging data (e.g., three-dimensional (3D) volumetric data sets, two-dimensional (2D) imaging slices, etc.) may be used to generate one or more images at the computing device 216, which may then be displayed to the operator or user at the display device 232. As such, the display device 232 may allow the operator to evaluate the imaged anatomy. The display device 232 may also allow the operator to select a volume of interest (VOI) and/or request patient information, for example, via a graphical user interface (GUI) for a subsequent scan or processing.

Referring to FIG. 3, a medical image processing system 300 is shown, in accordance with an exemplary embodiment. Medical image processing system 300 comprises image processing device 302, display device 320, user input device 330, and medical imaging device 340. In some embodiments, at least a portion of medical image processing system 300 is disposed at a remote device (e.g., edge device, server, etc.) communicably coupled to the medical image processing system 300 via wired and/or wireless connections. In some embodiments, at least a portion of image processing device 302 is disposed at a separate device (e.g., a workstation) configured to receive images from a storage device which stores images acquired by medical imaging device 340.

Image processing device 302 includes a processor 304 configured to execute machine readable instructions stored in non-transitory memory 306. Processor 304 may be single core or multi-core, and the programs executed thereon may be configured for parallel or distributed processing. In some embodiments, the processor 304 may optionally include individual components that are distributed throughout two or more devices, which may be remotely located and/or configured for coordinated processing. In some embodiments, one or more aspects of the processor 304 may be virtualized and executed by remotely-accessible networked computing devices configured in a cloud computing configuration.

Non-transitory memory 306 may store deep neural network module 308, training module 312, and image data 314. Deep neural network module 308 may include one or more deep neural networks, comprising a plurality of weights and biases, activation functions, and instructions for implementing the one or more deep neural networks to denoise images. For example, deep neural network module 308 may store instructions for implementing one or more deep neural networks configured to denoise images.

Deep neural network module 308 may include trained and/or un-trained deep neural networks. In some embodiments, the deep neural network module 308 is not disposed at the image processing device 302, but is disposed at a remote device communicably coupled with image processing device 302 via wired or wireless connection. Deep neural network module 308 may include various deep neural network metadata pertaining to the trained and/or un-trained networks. In some embodiments, the deep neural network metadata may include an indication of the training data used to train a deep neural network, a training method employed to train a deep neural network, and an accuracy/validation score of a trained deep neural network. In some embodiments, deep neural network module 308 may include metadata for a trained deep neural network indicating a type of anatomy, and/or a type of imaging modality, to which the trained deep neural network may be applied.

Non-transitory memory 306 further includes training module 312, which comprises machine executable instructions for training one or more of the deep neural networks stored in deep neural network module 308. In one embodiment, the training module 312 may include gradient descent algorithms, loss functions, and rules for generating and/or selecting training data for use in training a deep neural network. Training module 312 may further include instructions, that when executed by processor 304, cause image processing device 302 to train a deep neural network with a bias-reducing loss function by executing one or more of the operations of method 700, discussed in more detail below with reference to FIG. 7. In some embodiments, the training module 312 is not disposed at the image processing device 302, but is disposed remotely, and is communicably coupled with image processing device 302. An example architecture for training a deep neural network with the training module 312 is described further herein with regard to FIG. 6.

Non-transitory memory 306 may further store image data 314, comprising medical images/imaging data acquired by medical imaging device 340. Image data 314 may further comprise medical images/imaging data received from other medical imaging systems, via communicative coupling with the other medical imaging systems. The medical images stored in image data 314 may comprise medical images from various imaging modalities or from various models of medical imaging devices, and may comprise images of various views of anatomical regions of one or more patients. In some embodiments, medical images stored in image data 314 may include information identifying an imaging modality and/or an imaging device (e.g., model and manufacturer of an imaging device) by which the medical image was acquired. In some embodiments, image data 314 may comprise x-ray images acquired by an x-ray device, MR images captured by an MRI system, CT images captured by a CT imaging system, PET images captures by a PET system, and/or one or more additional types of medical images.

In some embodiments, the non-transitory memory 306 may include components disposed at two or more devices, which may be remotely located and/or configured for coordinated processing. In some embodiments, one or more aspects of the non-transitory memory 306 may include remotely-accessible networked storage devices configured in a cloud computing configuration.

Medical image processing system 300 further includes medical imaging device 340, which may comprise substantially any type of medical imaging device, including x-ray, MRI, CT, PET, hybrid PET/MR, ultrasound, etc. Medical imaging device 340 may acquire measurement data of an anatomical region of a patient, which may be used to generate medical images. The medical images generated from measurement data acquired by medical imaging device 340 may comprise two-dimensional (2D) or three-dimensional (3D) imaging data, wherein said imaging data may comprise a plurality of pixel intensity values (in the case of 2D medical images) or voxel intensity values (in the case of 3D medical images). The medical images acquired by medical imaging device 340 may comprise gray scale, or color images, and therefore the medical images stored in image data 314 may comprise a single color channel for gray scale images, or a plurality of color channels for colored medical images.

Medical image processing system 300 may further include user input device 330. User input device 330 may comprise one or more of a touchscreen, a keyboard, a mouse, a trackpad, a motion sensing camera, or other device configured to enable a user to interact with and manipulate data within image processing device 302.

Display device 320 may include one or more display devices utilizing virtually any type of technology. In some embodiments, display device 320 may comprise a computer monitor configured to display medical images of various types and styles. Display device 320 may be combined with processor 304, non-transitory memory 306, and/or user input device 330 in a shared enclosure, or may be a peripheral display device and may comprise a monitor, touchscreen, projector, or other display device known in the art, which may enable a user to view medical images having improved structural details while maintaining textural cues for the radiologist according to one or more embodiments of the current disclosure, and/or interact with various data stored in non-transitory memory 306.

It should be understood that medical image processing system 300 shown in FIG. 3 is for illustration, not for limitation. Another appropriate medical imaging system 300 may include more, fewer, or different components.

Turning now to the neural network configured for image denoising, the denoising problem is formulated in a Bayesian framework where the goal is to estimate an unknown random image X from a random noisy image Y. To that end, the image processing device 302 generates an estimate $\hat{X}$ of the unknown random image:

$$\hat{X}=f(Y)$$

with the mean squared error (MSE) defined by:

$$\text{MSE}_{\hat{X}}=\mathbb{E}\,[\|\hat{X}-X\|^2],$$

where $\mathbb{E}$, as used herein, denotes an expected value. Furthermore, the conditional expectation $\overline{X}$ of the estimate $\hat{X}$, given X, may be defined as:

$$\overline{X}=\mathbb{E}\,[\hat{X}|X],$$

where the conditional expectation $\overline{X}$ is a function of the random variable X. Using the definition of the conditional expectation $\overline{X}$, the expected squared bias of the estimate may be defined as:

$$\overline{\text{bias}^2}_{\hat{X}}=\mathbb{E}\,[\|\overline{X}-X\|^2].$$

Similarly, the variance of the estimate may be defined as:

$$\text{variance}_{\hat{X}}=\mathbb{E}\,[\|\hat{X}-\overline{X}\|^2].$$

The mean squared error MSE may then be expressed as:

$$\text{MSE}_{\hat{X}}=\text{variance}_{\hat{X}}+\overline{\text{bias}^2}_{\hat{X}}.$$

The bias term is caused by systematic errors in denoising such as blurring, streaking, or other artifacts. Meanwhile, the variance term represents the noisy variation in the estimate.

The bias is typically less desirable than variance because bias would exist even if the noisy variations were averaged out. Therefore, rather than minimizing the MSE, the image processing device 302 minimizes a weighted sum of the two terms in a bias-weighted MSE (BW-MSE) defined as:

$$BW-MSE^{\lambda}_{\hat{X}}\triangleq\lambda\;\text{variance}_{\hat{X}}+\overline{\text{bias}^2}_{\hat{X}},$$

where the weight parameter $\lambda$ is greater than zero and specifies the relative importance of the variance error. For example, with the weight parameter $\lambda$ less than one, the relative weight of the bias error is raised. Therefore, by decreasing the weight parameter $\lambda$, the bias in the estimate $\hat{X}$ is reduced.

FIG. 4 depicts a graph 400 illustrating the tradeoff between bias and variance. Squared bias is plotted along the x-axis and variance is plotted along the y-axis. In particular, the graph 400 includes a bias-variance tradeoff curve 405 of optimal bias-variance that can be obtained for an estimator, as well as a first bias-variance tradeoff point 402 for the MSE and a second bias-variance tradeoff point 403 on the curve 405 for the bias-weighted MSE. When the MSE is minimized, the first bias-variance tradeoff point 402 falls at the intersection of the bias-variance tradeoff curve 405 and a dashed line 412 that represents a line tangent to the bias-variance tradeoff curve 405 at the first bias-variance tradeoff point 402. However, the image texture of the resulting image at the first bias-variance tradeoff point 402 may be smoother than desirable for x-ray imaging applications. The second bias-variance tradeoff point 403 on the bias-variance tradeoff curve 405 increases variance but reduces bias and may therefore be selected by selecting a value of the weight parameter $\lambda$ in the bias-weighted MSE, as described herein.

The bias-weighted MSE may be approximated with a bias-reducing loss (BR-loss) function. A pair of noisy inputs are generated for training by adding two independent noise realizations to the same ground truth image. For example, for each ground truth image in a set of ground truth images $$\{X_k\}_{k=1}^K$$

for training, where each $X_k$ is independent and identically distributed with the same distribution as the image X, two conditionally independent noisy images $Y_{k,1}$ and $Y_{k,2}$ are generated with the same conditional distribution. From these two noisy realizations, two conditionally independent denoised estimates are also obtained:

$$\hat{X}_{k,1}=f_\theta(Y_{k,1})$$

$$\hat{X}_{k,2}=f_\theta(Y_{k,2})$$

where $f_\theta(\omega)$ is a denoising algorithm with parameters $\theta$. A traditional MSE loss function $\mathcal{L}_\theta^{(MSE)}$ is thus given by:

$$\mathcal{L}_\theta^{(MSE)}=\frac{1}{2K}\sum_{k=1}^K\left\{\left\|\hat{X}_{k,1}-X_k\right\|^2+\left\|\hat{X}_{k,2}-X_k\right\|^2\right\},$$

such that the mean squared error MSE may be expressed in terms of the loss function:

$$\text{MSE}_{\hat{X}}=\mathbb{E}\,[\mathcal{L}_\theta^{MSE}]$$

In order to construct the bias-reducing loss function, two new bias-reducing estimates are formed:

$$\hat{Z}_{k,1}=\alpha\hat{X}_{k,1}+(1-\alpha)\hat{X}_{k,2},$$

$$\hat{Z}_{k,2}=(1-\alpha)\hat{X}_{k,1}+\alpha\hat{X}_{k,2},$$

where the bias-reducing parameter $\alpha\in[0,1]$. The bias-reducing loss function may then be defined as:

$$\mathcal{L}_{\theta,\alpha}^{(BR)}=\frac{1}{2K}\sum_{k=1}^K\left\{\left\|\hat{Z}_{k,1}-X_k\right\|^2+\left\|\hat{Z}_{k,2}-X_k\right\|^2\right\}.$$

In order to show that the bias-reducing loss function approximates the bias-weighted MSE, it should be noted that the two denoised estimates $\hat{X}_{k,1}$ and $X_{k,2}$ are conditionally independent and follow the same conditional distribution given X. The conditional variance of the bias-reducing estimate is therefore:

$$\text{Var}[\hat{Z}_{k,1}|X_k]=\alpha^2\text{Var}[\hat{X}_{k,1}|X_k]+(1-\alpha)^2\text{Var}[\hat{X}_{k,2}|X_k],$$

where $\mathrm{Var}[\bullet|X_k]$ is the conditional variance of the argument given $X_k$. Then, the variance of the bias-reducing estimate is:

$$\mathrm{variance}_{\hat{Z}}=\mathbb{E}\,[\|\hat{Z}_{k,1}-\overline{Z}_{k,1}\|^2]=\mathbb{E}\,[\mathrm{Var}[\hat{Z}_{k,1}|X_k]].$$

In view of the conditional variance of the bias-reducing estimate, the variance therefore may be expressed as:

$$\mathrm{variance}_{\hat{Z}}=[\alpha^2+(1-\alpha)^2]\mathbb{E}\,[\mathrm{Var}[\hat{X}_{k,1}|X_k]].$$

Considering the conditional variance of the first denoised estimate, the variance of the bias-reducing estimate may thus be expressed as:

$$\mathrm{variance}_{\hat{Z}}=[\alpha^2+(1-\alpha)^2]\mathbb{E}\,[\|\hat{X}_{k,1}-\overline{X}_{k,1}\|^2].$$

Recalling the definition of the variance for the estimate X, the variance of the bias-reducing estimate is therefore proportional to the variance of the estimate, where the proportionality depends on the bias-reducing parameter $\alpha$:

$$\mathrm{variance}_{\hat{Z}}=[\alpha^2+(1-\alpha)^2]\mathrm{variance}_{\hat{X}}.$$

Furthermore, the conditional expectation of the bias-reducing estimate is equivalent to the conditional expectation of the estimate:

$$\overline{Z}_{k,1}=\mathbb{E}\,[\hat{Z}_{k,1}|X_k]=\alpha\,\mathbb{E}\,[\hat{X}_{k,1}|X_k]+(1-\alpha)\,\mathbb{E}\,[\hat{X}_{k,2}|X_k]=\overline{X}_{k,1}.$$

As the conditional expectation of the bias-reducing estimate is equivalent to the conditional expectation of the estimate, the bias terms are also equivalent:

$$\overline{\mathrm{bias}^2}_{\hat{Z}}=\overline{\mathrm{bias}^2}_{\hat{X}}.$$

The bias-reducing loss function may be considered with regard to the mean squared error for the bias-reducing estimates:

$$\mathbb{E}\left[\mathcal{L}_{\theta,\alpha}^{(BR)}\right]=MSE_{\hat{Z}}=\mathrm{variance}_{\hat{Z}}+\overline{\mathrm{bias}^2}_{\hat{Z}}.$$

Consequently, the bias-reducing loss function approximates the bias-weighted MSE:

$$\mathbb{E}\left[\mathcal{L}_{\theta,\alpha}^{(BR)}\right]=\left[\alpha^2+(1-\alpha)^2\right]\mathrm{variance}_{\hat{X}}+\overline{\mathrm{bias}^2}_{\hat{X}}=BW-MSE_{\hat{X}}^{\lambda},$$

where the weight parameter $\lambda$ is:

$$\lambda=\alpha^2+(1-\alpha)^2.$$

Therefore, the adjustable bias-reducing parameter $\alpha$ controls the reduction in bias achieved. FIG. 5 shows a graph 500 illustrating a plot of the weight parameter as the bias-reducing parameter $\alpha$ varies from zero to one. Graph 500 includes an x-axis 502, which shows the bias-reducing parameter $\alpha$ as it ranges from 0 to 1 and a y-axis 504 which shows the weight parameter $\lambda$ as it ranges from 0 to 1. The relationship between $\alpha$ and $\lambda$ is represented by a curve 506.

FIG. 6 shows a block diagram illustrating an example deep learning architecture 600 for using the bias-reducing loss function described herein to train a neural network on bias-reduced image denoising. As depicted, two independent noise realizations, e.g. a first noise image $(w_1)$ 604 and a second noise image $(w_2)$ 608 are applied to a ground truth image $(x_k)$ 602 to obtain two noisy input images: a first noisy input image $(y_{k,1})$ 606 and a second noisy input image $(y_{k,2})$ 610. The denoising neural network or denoising network $(f_\theta)$ 611 is depicted as two denoising networks: a first denoising network 612 and a second denoising network 616, though both the first denoising network 612 and the second denoising network 616 share the same parameters and so the networks are treated as a Siamese network for training. Once trained, the standalone denoising network is used to denoise image. Therefore, the deep learning architecture 600 depicted is configured for training the denoising network 611, and in practice, only a single denoising network 611 thus trained is used for bias-reduced denoising of a noisy input image.

Given a noisy input, the denoising network 611 outputs a denoised image. During training, as depicted, the first noisy image 606 is input into the first denoising network 612, which outputs a first denoised image estimate $(\hat{x}_{k,1})$ 614. The second noisy image 610 is input into the second denoising network 616, which generates a second denoised image estimate $(\hat{x}_{k,2})$ 618 as output.

A second bias-reducing estimate $(\hat{z}_{k,1})$ 622 is computed by multiplying the first denoised image estimate 614 by a parameter $\alpha$ to generate a first product, multiplying the second denoised image estimate 618 by $(1-\alpha)$ to generate a second product, and adding the first product and the second product together. Similarly, a first bias-reducing estimate $(\hat{z}_{k,2})$ 620 is computed by multiplying the second denoised image estimate 618 by $\alpha$ to generate a third product, multiplying the first denoised image estimate 614 by $(1-\alpha)$ to generate a fourth product, and adding the third product the fourth product together.

The first bias-reducing estimate 620 and the second bias-reducing estimate 622 and the ground truth image 602 are then used for the bias-reducing loss function 624 calculation, and back propagation 626 is performed to update the parameters of the denoising network 611 (e.g. the parameters shared by the first denoising network 612 and the second denoising network 616). For example, the gradient of the bias-reducing loss function 624 with respect to the weights of the denoising network 611 may be used to update the parameters of the denoising network 611, e.g., according to a gradient descent technique.

In order to alleviate the problem of vanishing gradient and to improve accuracy, a residual training may be employed to train the denoising network. For a noisy input Y, a residual network $\tilde{f}_\theta$ outputs a noise residual image:

$$\tilde{W}=\tilde{f}_\theta(Y).$$

The estimate of the denoised image $\hat{X}$ is therefore determined as:

$$\hat{X}=Y-\tilde{W}.$$

The units of the deep learning architecture 600 are linear. Hence, the loss function for residual training is obtained by rearranging the terms in the bias-reducing loss function:

$$\mathcal{L}_{\theta,\alpha}^{(BR)}=\frac{1}{2K}\sum_{k=1}^{K}\{\|R_{k,1}-(\overline{Y}_{k,1}-X_k)\|^2+\|R_{k,2}-(\overline{Y}_{k,2}-X_k)\|^2\},$$

where:

$$\overline{Y}_{k,1}=\alpha Y_{k,1}+(1-\alpha)Y_{k,2},$$

$$R_{k,1}=\alpha\tilde{W}_{k,1}+(1-\alpha)\tilde{W}_{k,2},$$

$$\overline{Y}_{k,2}=\alpha Y_{k,2}+(1-\alpha)Y_{k,1},$$

$$R_{k,2}=\alpha\tilde{W}_{k,2}+(1-\alpha)\tilde{W}_{k,1}.$$

The denoising network may thus be trained using residual training with the bias-reducing loss function above to improve accuracy and avoid vanishing gradient issues.

Although the approach for bias-reducing loss functions provided hereinabove refers to the use of two noise realizations, it should be appreciated that the bias-reducing loss function may be extended for two or more noise realizations to obtain a higher bias reduction (or lower parameter $\lambda$). For example, an estimate for $n \geq 2$ noise realizations may be defined as:

$$\hat{Z}_k = \alpha_1 \hat{X}_{k,1} + \alpha_2 \hat{X}_{k,2} + \ldots + \alpha_n \hat{X}_{k,n},$$

where $$\alpha_1 + \alpha_2 + \ldots + \alpha_n = 1,$$

and $$\alpha_1, \ldots, \alpha_n \geq 0.$$

Then the bias-reducing loss function is defined as:

$$\mathcal{L}_{\theta,\alpha_1,\ldots,\alpha_n}^{(BR)} = \frac{1}{K}\sum_{k=1}^{K}\left\{\left\|\hat{Z}_k - X_k\right\|^2\right\}.$$

Using the same reasoning as above, the conditional variance of the bias-reducing estimate is therefore:

$$\text{Var}\left[\hat{Z}_k | X_k\right] = \alpha_1^2 \text{Var}\left[\hat{X}_{k,1} | X_k\right] + \alpha_2^2 \text{Var}\left[\hat{X}_{k,2} | X_k\right] + \cdots + \alpha_n^2 \text{Var}\left[\hat{X}_{k,n} | X_k\right].$$

The variance term may be expressed as:

$$\text{variance}_Z = \mathbb{E}\left[\|\hat{Z}_k - \bar{Z}_k\|^2\right] - \mathbb{E}\left[\text{Var}[\hat{Z}_k | X_k]\right].$$

In view of the above expression for the conditional variance, the variance term for the bias-reduced estimate may be expressed in terms of the variance term for the estimate:

$$\begin{aligned}\text{variance}_Z &= \left[\alpha_1^2 + \alpha_2^2 + \cdots + \alpha_n^2\right]\mathbb{E}\left[\text{Var}[\hat{X}_{k,1} | X_k]\right]\\ &= \left[\alpha_1^2 + \alpha_2^2 + \cdots + \alpha_n^2\right]\mathbb{E}\left[\left\|\hat{X}_{k,1} - \bar{X}_{k,1}\right\|^2\right]\\ &= \left[\alpha_1^2 + \alpha_2^2 + \cdots + \alpha_n^2\right]\text{variance}_{\hat{X}}.\end{aligned}$$

Similar to the result for two noise realizations, the conditional expectation for the bias-reduced estimate is equivalent to the conditional expectation for the estimate:

$$\bar{Z}_k \mathbb{E}\left[\hat{Z}_k | X_k\right] = \alpha_1 \mathbb{E}\left[\hat{X}_{k,1} | X_k\right] + \alpha_2 \mathbb{E}\left[\hat{X}_{k,2} | X_k\right] + \ldots + \alpha_n \mathbb{E}\left[\hat{X}_{k,n} | X_k\right] = \bar{X}_{k,1}.$$

Therefore, the bias terms are also equivalent:

$$\overline{\text{bias}^2}_Z = \overline{\text{bias}^2}_{\hat{X}}.$$

The generalized bias-reducing loss function may be considered with regard to the mean squared error for the bias-reducing estimates:

$$\mathbb{E}\left[\mathcal{L}_{\theta,\alpha_1,\ldots,\alpha_n}^{(BR)}\right] = MSE_Z = \text{variance}_Z + \overline{\text{bias}^2}_Z.$$

Consequently, in view of the above, the bias-reducing loss function approximates the bias-weighted MSE:

$$\mathbb{E}\left[\mathcal{L}_{\theta,\alpha_1,\ldots,\alpha_n}^{(BR)}\right] = \left[\alpha_1^2 + \alpha_2^2 + \cdots + \alpha_n^2\right]\text{variance}_{\hat{X}} + \overline{\text{bias}^2}_{\hat{X}} = BW - MSE_{\hat{X}}^{\lambda},$$

16 where the weight parameter $\lambda$ is:

$$\lambda = \alpha_1^2 + \alpha_2^2 + \cdots + \alpha_n^2.$$

The minimum possible weight parameter $\lambda$ occurs when $$\alpha_1 = \alpha_2 = \ldots = \alpha_n = 1/n.$$

In this case, the minimum weight parameter is:

$$\lambda = \frac{1}{n}.$$

In the limiting case as n goes to infinity, the weight parameter $\lambda$ goes to zero.

FIG. 7 shows a high-level flow chart illustrating an example method 700 for training a deep neural network to denoise images with a user-selected amount of texture and detail. In particular, method 700 relates to training a deep neural network with a bias-reducing loss function as described hereinabove. Method 700 is described with regard to the systems and components of FIGS. 1-3 and 6, though it should be appreciated that the method 700 may be implemented with other systems and components without departing from the scope of the present disclosure.

Method 700 begins at 705. At 705, method 700 loads a training dataset including a plurality of ground truth images. At 710, method 700 receives a selection of a bias-reduction parameter. The bias-reduction parameter may comprise a selection of A or a, in some examples. The bias-reduction parameter may be selected to reduce bias while allowing additional variance in the denoising. Method 700 may receive a selection of the bias-reduction parameter from a user, for example, or in other examples method 700 may receive a selection of a denoising application and determine a bias-reduction parameter based on the selected denoising application.

At 715, method 700 generates at least two conditionally independent noisy images for each ground truth image. At 720, method 700 inputs the at least two conditionally independent noisy images for each ground truth image into the neural network to generate corresponding denoised images for each ground truth image. At 725, method 700 generates at least one bias-reduced estimate image for each ground truth image based on weighted combinations of the denoised images for each ground truth image, where the weighted combinations are weighted based on the selected bias-reduction parameter. In some examples, method 700 may generate two or more bias-reduced estimate images for each ground truth image, for example as discussed hereinabove with regard to FIG. 6, wherein the weights applied to each denoised image are switched to obtain an additional bias-reduced estimate image.

At 730, method 700 calculates a bias-reduced loss for each ground truth image based on the at least one bias-reduced estimate image and the ground truth image. At 735, method 700 performs backpropagation according to the bias-reduced loss for each ground truth image to update the parameters of the neural network. In this way, method 700 trains the neural network to denoise input images with a selected tradeoff between bias and variance. Method 700 then returns.

Once trained according to method 700, the deep neural network (which may also be referred to as a trained denoising model) may be deployed on one or more computing devices configured to receive medical images, such as on computing device 216, PACS 224, workstation 234, and/or image processing device 302.

FIG. 11 is a flow chart illustrating a method 1100 for denoising an image using a trained denoising model. Method 1100 may be carried out according to instructions stored in memory of a computing device, such as computing device 216.

At 1105, an image is acquired. The image may be a CT image acquired with the CT system of FIGS. 1-2, though other images are within the scope of this disclosure. The image may be reconstructed from projection data using a suitable reconstruction technique, such as backprojection, iterative reconstruction, and/or deep learning-based reconstruction. The image may include anatomical features in a suitable scan plane.

At 1110, the acquired image is entered as input to a trained denoising model, such as a model trained according to method 700 above. The trained denoising model is configured to output a reduced-noise image (e.g., a denoised image) based on the input image, e.g., a version of the input image with reduced noise. The trained denoising model is trained with a bias-reduced loss function, as explained above.

At 1115, the denoised image is received from the trained denoising model. The denoised image may have reduced noise relative to the input image with the bias-reduction as disclosed herein, and thus may include/maintain the image texture and detail of the input image with a reduced amount of image noise relative to the input image. At 1120, the denoised image is output for display on a display device and/or saved in memory. Method 1100 then returns.

To illustrate an implementation of the bias-reducing loss function described hereinabove, the denoising algorithm provided herein was applied to example low-dose clinical examination. For example, twenty-nine raw clinical scans using a CT scanner (e.g., a CT imaging system such as the CT imaging system of FIGS. 1-2) with an x-ray tube voltage and current varying from scan to scan in a range of 80-140 kVp and 40-1080 mA, respectively. The projection data obtained from the scans were reconstructed using deep learning image reconstruction (DLIR) technology to a slice thickness of 0.625 mm and dimension 512×512. The reconstructed volumes were used as ground truth images. Twenty of these volumes comprising 9,776 axial slices in total were used for training and validation, while nine remaining volumes with 5,229 slices were used for testing. A denoising CNN was trained using the proposed bias-reducing loss function as described herein for a value of a, referred to hereinbelow as BR-DN-α. For comparison, a denoising CNN was separately trained using a conventional MSE loss function, referred to hereinbelow as MSE-DN. As an illustrative example, the denoising CNN may include a single input channel and seventeen convolution layers.

Further, seven water phantoms were scanned with a tube voltage of 120 kVp and a tube current of either 350 or 380 mA varying from scan to scan. The projection data from the scans were reconstructed with filtered backprojection to a slice thickness of 0.625 mm and used to generate the random noise realizations. Six of these volumes totaling 1,131 axial slices were employed for training and validation, while the seventh volume with 249 slices was used for testing. In addition, a low-dose clinical examination, acquired at 80 kVp tube voltage and 75 mA tube current, was collected. The examination was reconstructed with FBP. As low-dose scans are noisy, this reconstruction is used herein below for subjective evaluation.

Axial slices in the training and validation volumes were broken into 128×128 patches, with the patches randomly partitioned as 97% for training and 3% for validation. Each ground truth patch was added to two randomly selected noise patches to form two independent noisy realizations for the same ground truth patch.

To train the network, an ADAM optimizer with an initial learning rate of 0.001 and a mini-batch size of 32 was used. The learning rate was reduced by a factor of four if no improvement in validation loss occurred for five epochs, and the training was stopped if the validation loss was not improved for sixteen consecutive epochs. The network was implemented in Keras and trained with two GPUs. Quantitative evaluation was done using the volumes kept aside for testing. The similarity of denoised images with ground truth images was quantified using the average structural similarity (SSIM) and PSNR.

FIG. 8 shows a set of input images 800, including a first input image 802, a second input image 804, a third input image 806, and a fourth input image 808, which may be entered as input into the trained denoising model provided herein. Each of the first input image 802, second input image 804, third input image 806, and fourth input image 808 show the input low-dose noisy slices. Each of the images 800 are images of different organs and different scan planes, which are chosen to demonstrate robustness of the proposed bias-reducing loss function.

FIG. 9 shows a collection of images 900, featuring a first image 902, a second image 904, a third image 906, and a fourth image 908. The first image 902, the second image 904, the third image 906, and the fourth image 908 show the denoised results with the MSE-DN of the first input image 802, the second input image 804, the third input image 806, and the fourth input image 808, respectively.

The collection of images 900 further includes a fifth image 910, a sixth image 912, a seventh image 914, and an eighth image 916. The fifth image 910, the sixth image 912, the seventh image 914, and the eighth image 916 show the denoised results with the BR-DN-0.75 (e.g., the images output by the trained denoising model disclosed herein), of the first input image 802, the second input image 804, the third input image 806, and the fourth input image 808, respectively. It should be appreciated that the proposed BR-DN-0.75 denoiser retains more texture and detail than in the MSE-DN denoised images, while still removing most of the noise. Furthermore, the BR-DN-0.75 denoiser improves the contrast and sharpness of vessels as seen in the difference in results between the first image 902 and the fifth image 910. The proposed network recovers vessels and lung fissure missing in MSE-DN results as indicated by a first arrow 905 in the second image 904, a second arrow 913 in the sixth image 912, a third arrow 907 in the third image 906 and a fourth arrow 915 in the seventh image 914. The performance is consistent in orthogonal planes as well, as depicted by results of the fourth image 908 and the eighth image 916. In the collection of images 900, the display window for the third image 906 and the seventh image 914 is [−700, 1000] HU and the display window for the first image 902, the second image 904, the fourth image 908, the fifth image 910, the sixth image 912, and the eighth image 916 is [50, 350] HU.

The proposed BR-DN-0.75 denoiser improves the average SSIM by 1.48% as compared to the MSE-DN denoiser. This is likely because the BR-DN-0.75 denoiser retains more detail and texture than the MSE-DN. Since the MSE loss function is designed to optimize the peak signal to noise ratio (PSNR), the BR-DN-0.75 denoiser results in a PSNR that is lowered by 0.55%.

FIG. 10 shows a set of images 1000 illustrating how the denoised results change depending on a choice of the parameter α. Each image within the set of images was obtained through the use of a BR-DN-α, where α varies between the images. The set of images 1000 includes a first image 1002, where α=1.0, a second image 1006, where α=0.875, a third image 1010, where α=0.75, a fourth image 1014, where α=0.625, and a fifth image 1018, where α=0.5.

Each image within the set of images further includes a uniform region; the first image 1002 includes a first uniform region 1004, the second image 1006 includes a second uniform region 1008, the third image 1010 includes a third uniform region 1012, the fourth image 1014 includes a fourth uniform region 1016, and the fifth image 1018 includes a fifth uniform region 1020. Each of the uniform regions represent the same spatial location within the images. As the value of a is reduced from 1.0 (e.g., in first image 1002) to 0.5 (e.g., in fifth image 1018), the value of a variance in HU numbers in the corresponding uniform regions increases: the variance of the first uniform region 1004 is 6.25 HU, the variance of the second uniform region 1008 is 7.29 HU, the variance of the third uniform region 1012 is 9.61 HU, the variance of the fourth uniform region 1016 is 14.44 HU, and the variance of the fifth uniform region 1020 is 18.49 HU. The increase in variance along with the increase in image detail with decreasing values of the parameter α is consistent with a reduction in bias.

A technical effect of using a bias-reducing loss function to train a denoising network is to increase a sharpness and contrast within denoised images, which allows for a user to see an increased detail in a texture within denoised images. The improved performance of the denoised image further allows lower-radiation doses to be administered during, for example, a CT scan.

The disclosure also provides support for a method, comprising: acquiring an image, inputting the image to a machine learning model to generate a denoised image, the machine learning model trained with a loss function that weights variance differently from bias, and outputting the denoised image. In a first example of the method, the method further comprises: receiving a user selection of a bias-reduction parameter, and training the machine learning model with the loss function according to the bias-reduction parameter, wherein the variance and the bias are weighted differently in the loss function according to the bias-reduction parameter. In a second example of the method, optionally including the first example during training of the machine learning model, the loss function computes an error between a weighted average of two or more enhanced images and a ground truth image. In a third example of the method, optionally including one or both of the first and second examples, the method further comprises: during training of the machine learning model, generating two or more noisy images from the ground truth image according to two or more independent noise realizations. In a fourth example of the method, optionally including one or more or each of the first through third examples, the method further comprises: during training of the machine learning model, inputting the two or more noisy images to the machine learning model to generate the two or more enhanced images. In a fifth example of the method, optionally including one or more or each of the first through fourth examples, the loss function computes a first error between a first weighted average of the two or more enhanced images and the ground truth image, and a second error between a second weighted average of the two or more enhanced images and the ground truth image. In a sixth example of the method, optionally including one or more or each of the first through fifth examples, the machine learning model comprises a convolutional neural network. In a seventh example of the method, optionally including one or more or each of the first through sixth examples, the method further comprises: training the machine learning model with a residual training strategy. In an eighth example of the method, optionally including one or more or each of the first through seventh examples, acquiring the image comprises controlling a computed tomography (CT) imaging system to acquire the image. In a ninth example of the method, optionally including one or more or each of the first through eighth examples, outputting the denoised image comprises displaying, via a display device, the denoised image, wherein the denoised image includes image texture and detail of the image with a reduced amount of image noise relative to the image.

The disclosure also provides support for a method for training a neural network, comprising: loading a training dataset including a plurality of ground truth images, generating at least two noisy images for each ground truth image, inputting the at least two noisy images for each ground truth image to the neural network to generate corresponding denoised images for each ground truth image, generating a bias-reduced estimate image for each ground truth image based on weighted combinations of the denoised images for each ground truth image, calculating a bias-reduced loss for each ground truth image based on the bias-reduced estimate image and the ground truth image, and updating parameters of the neural network according to the bias-reduced loss for each ground truth image. In a first example of the method, the method further comprises: receiving a selection of a bias-reduction parameter. In a second example of the method, optionally including the first example, the method further comprises: generating the weighted combinations of the denoised images for each ground truth image according to the selected bias-reduction parameter, wherein bias and variance of the denoised image are not equally weighted according to the selected bias-reduction parameter.

The disclosure also provides support for a system, comprising: an image processing device communicatively coupled to a medical imaging system and storing instructions in non-transitory memory, the instructions executable to: acquire, via the medical imaging system, an image, input the image to a machine learning model stored in the non-transitory memory to generate a denoised image, the machine learning model trained with a loss function that weights variance differently from bias, and output the denoised image. In a first example of the system, the image processing device further stores instructions in the non-transitory memory, the instructions executable to receive a user selection of a bias-reduction parameter, and train the machine learning model with the loss function according to the bias-reduction parameter, wherein the variance and the bias are weighted differently in the loss function according to the bias-reduction parameter. In a second example of the system, optionally including the first example during training of the machine learning model, the loss function computes an error between a weighted average of two or more enhanced images and a ground truth image. In a third example of the system, optionally including one or both of the first and second examples, the image processing device further stores instructions in the non-transitory memory, the instructions executable to, during training of the machine learning model, generate two or more noisy images from the ground truth image according to two or more independent noise realizations. In a fourth example of the system, optionally including one or more or each of the first through third examples, the image processing device further stores instructions in the non-transitory memory, the instructions executable to, during training of the machine learning model, input the two or more noisy images to the machine learning model to generate the two or more enhanced images. In a fifth example of the system, optionally including one or more or each of the first through fourth examples, the loss function computes a first error between a first weighted average of the two or more enhanced images and the ground truth image, and a second error between a second weighted average of the two or more enhanced images and the ground truth image. In a sixth example of the system, optionally including one or more or each of the first through fifth examples, the medical imaging system comprises a computed tomography imaging system, and wherein the loss function weights the variance differently from the bias to reduce bias in the denoised image while increasing variance in the denoised image.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
acquiring an image;
inputting the image to a machine learning model to generate a denoised image, the machine learning model trained with a bias-reducing loss function that approximates a loss function that weights variance differently from bias by applying a bias-reducing parameter to the variance, wherein training the machine learning model with the bias-reducing loss function includes calculating a bias-reduced loss for a ground truth image based on a corresponding bias-reduced estimate image and the ground truth image, the bias-reduced estimate image generated based on a weighted combination of denoised images output by the machine learning model, the weighted combination weighted based on the bias-reducing parameter; and
outputting the denoised image.

2. The method of claim 1, further comprising receiving a user selection of the bias-reduction parameter, wherein the bias-reducing parameter is a value that is greater than zero and less than one.

3. The method of claim 1, wherein the machine learning model comprises a convolutional neural network.

4. The method of claim 3, further comprising training the machine learning model with a residual training strategy.

5. The method of claim 1, wherein acquiring the image comprises controlling a computed tomography (CT) imaging system to acquire the image.

6. The method of claim 1, wherein outputting the denoised image comprises displaying, via a display device, the denoised image, wherein the denoised image includes image texture and detail of the image with a reduced amount of image noise relative to the image.

7. A method, comprising:
acquiring an image;
inputting the image to a machine learning model to generate a denoised image, the machine learning model trained with a loss function that weights variance differently from bias by applying a bias-reducing parameter to the variance; and
outputting the denoised image, wherein, during training of the machine learning model, the loss function computes an error between a weighted average of two or more enhanced images and a ground truth image, and further comprising, during training of the machine learning model, generating two or more noisy images from the ground truth image according to two or more independent noise realizations.

8. The method of claim 7, further comprising, during training of the machine learning model, inputting the two or more noisy images to the machine learning model to generate the two or more enhanced images.

9. The method of claim 7, wherein the loss function computes a first error between a first weighted average of the two or more enhanced images and the ground truth image, and a second error between a second weighted average of the two or more enhanced images and the ground truth image.

10. A system, comprising:
an image processing device communicatively coupled to a medical imaging system and storing instructions in non-transitory memory, the instructions executable to:
acquire, via the medical imaging system, an image;
input the image to a machine learning model stored in the non-transitory memory to generate a denoised image, the machine learning model trained with a loss function that weights variance differently from bias by calculating a bias-reduced loss for a ground truth image based on a corresponding bias-reduced estimate image and the ground truth image, the bias-reduced estimate image generated based on a weighted combination of denoised images output by the machine learning model, the weighted combination weighted by applying a bias-reducing parameter; and
output the denoised image.

11. The system of claim 10, wherein the image processing device further stores instructions in the non-transitory memory, the instructions executable to receive a user selection of the bias-reduction parameter.

12. The system of claim 10, wherein the image processing device further stores instructions in the non-transitory memory, the instructions executable to, during training of the machine learning model, generate two or more noisy images from the ground truth image according to two or more independent noise realizations.

13. The system of claim 12, wherein the image processing device further stores instructions in the non-transitory memory, the instructions executable to, during training of the machine learning model, input the two or more noisy images to the machine learning model to generate the denoised images.

14. The system of claim 10, wherein the bias-reduced loss includes a first error between a first weighted average of the denoised images and the ground truth image, and a second error between a second weighted average of the denoised images and the ground truth image.

15. The system of claim 10, wherein the medical imaging system comprises a computed tomography imaging system, and wherein the loss function weights the variance differently from the bias to reduce bias in the denoised image while increasing variance in the denoised image.

* * * * *